(12) United States Patent
Tsao et al.

(10) Patent No.: US 10,077,806 B2
(45) Date of Patent: Sep. 18, 2018

(54) COMPACT BEARING SYSTEM AND MACHINE STAGE SYSTEM EQUIPPING THE SAME

(71) Applicant: NATIONAL TSING HUA UNIVERSITY, Hsinchu (TW)

(72) Inventors: Che-Chih Tsao, Hsinchu (TW); Zong-Lin Li, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 11 days.

(21) Appl. No.: 15/210,902

(22) Filed: Jul. 15, 2016

(65) Prior Publication Data
US 2017/0016478 A1 Jan. 19, 2017

Related U.S. Application Data

(60) Provisional application No. 62/192,722, filed on Jul. 15, 2015.

(51) Int. Cl.
*F16C 32/06* (2006.01)

(52) U.S. Cl.
CPC ...... *F16C 32/0648* (2013.01); *F16C 32/0644* (2013.01); *F16C 2322/39* (2013.01)

(58) Field of Classification Search
CPC .......... F16C 29/025; F16C 32/0603; F16C 32/0607; F16C 32/0633; F16C 32/064; F16C 32/0644; F16C 32/0648; F16C 32/0659; F16C 32/0666; F16C 32/0674
See application file for complete search history.

(56) References Cited

U.S. PATENT DOCUMENTS 3,841,719 A 10/1974 Smith
4,076,335 A 2/1978 Ahmed et al.
(Continued)

FOREIGN PATENT DOCUMENTS

CN 1318136 A 10/2001
CN 1685167 A 10/2005

OTHER PUBLICATIONS

An explanation of the relevance of the above-mentioned prior arts.
(Continued)

*Primary Examiner* — James Pilkington
(74) *Attorney, Agent, or Firm* — CKC & Partners Co., Ltd.

(57) ABSTRACT

A compact bearing system capable of variable load carrying capability and precision motion on a guideway includes a bearing body, a fluid medium, a sealing bearing member and a pressurizing actuation means installed as an integral part of the bearing body. The bearing body includes an internal pocket with an open side facing a surface of said guideway. The fluid medium is contained inside said internal pocket and is in contact with said surface of said guideway on said open side. The sealing bearing member is in contact with said surface of said guideway and seals a clearance between said bearing body and said surface of said guideway to limit leakage of said fluid medium. The pressurizing actuation means pressurizes the confined fluid medium through a small passage, and the pressurized fluid medium carrying a main portion of a load carried on said compact bearing system.

11 Claims, 6 Drawing Sheets

(56) References Cited

U.S. PATENT DOCUMENTS

| | | | | |
|---|---|---|---|---|
| 4,215,903 A | * | 8/1980 | Andrews | F16C 32/0644 384/114 |
| 4,836,693 A | * | 6/1989 | Stroze | F04B 1/2085 384/121 |
| 6,644,856 B2 | * | 11/2003 | Lasch | F16C 29/025 384/100 |
| 7,621,346 B1 | | 11/2009 | Trinh et al. | |
| 2013/0108192 A1 | * | 5/2013 | Hashimoto | F16C 32/0648 384/12 |

OTHER PUBLICATIONS

Alexander H. Slocum, Precision machine design, published in 1992, chapters 8-9, pp. 421-639, published by Prentice-Hall, Inc., United States.

Robert V. Brink et al., Handbook of fluid sealing, published in 1993, pp. 8.7, 8.9, 8.10 and 8.11, published by McGraw-Hill, Inc., United States.

* cited by examiner

COMPACT BEARING SYSTEM AND MACHINE STAGE SYSTEM EQUIPPING THE SAME

RELATED APPLICATIONS

This application claims priority to U.S. Provisional Application Ser. No. 62/192,722, filed Jul. 15, 2015, which is herein incorporated by reference.

BACKGROUND

Technical Field

The present disclosure relates to a compact bearing system and a machine stage system equipping the same. More particularly, the present disclosure relates to a compact bearing system featuring a new "sealed pad hydrostatic bearing" with a simple, compact and low cost design in order to reduce or eliminate the disadvantage of requiring complex oil supply and handling system on existing hydrostatic bearing systems.

Description of Related Art

Existing hydrostatic bearing system has the following disadvantages: (1) the construction is complicated; (2) the system cost is high; (3) oil temperature tends to increase at high traveling speeds. The complicated construction requires a complex oil supply system, including pumps, motors, pressure vessels, oil tanks, various oil filters, valves and controllers, pipes, flow regulators and oil temperature control systems, in order to maintain the pressure and temperature of the circulating oil. These factors result in the high system cost. This oil supply and pressurizing system is usually bulky and has to be installed in a separate area away from machine stages that contain the hydrostatic bearings. In addition, the bearing gap for oil passage is very small. When the stage travels at high speed, the shear stress in the thin oil film becomes very high (viscous fluid shear stress $\tau=F/A=U/h$), which induces heat by friction. The viscosity of oil is generally very sensitive to temperature change. The viscosity variation can cause changes of flow resistance in the land area, thereby resulting in deviations of pocket oil pressure and temperature. As a result, stages with hydrostatic bearings usually travel at speed not higher than 2 m/sec (Ref. Slocum, A. H., Precision Machine Design, Prentice Hall, New Jersey, 1992, Chapter 9).

In modern arts of bearing technologies, sliding contact bearings have been used together with hydraulic or pneumatic bearings as backup bearings. And in machine stages using sliding contact bearings as primary load carrying bearings, air or oil assist has been used to relieve load and reduce drag in order to make high-speed positioning (i.e. rapid traverse). This entails providing pockets in the bearings: one pocket is required for pressurized fluid to take the weight of the machine and preload off the bearing, and often a second, smaller pocket is required on the opposing pad to relieve the opposing preload force (Ref. Slocum, A. H., Ibid, Chapter 8, Section 8.2.1, sub-section "Preload"). Details of such arrangement were not described, but the air or oil assisting bearings available in the arts are likely to be either the hydrostatic (including pneumatic) bearings described earlier, which require constant pumping of fluid through finite bearing gaps, or simple closed pad hydrostatic bearing. An example of the use of simple closed pad hydrostatic bearing is described in Trinh and Sullivan (U.S. Pat. No. 7,621,346) for a rotary head of an oil drilling machine. In journal bearings or plane bearings, it is quite common that slots or circular recesses are made on the contacting surfaces in order to assist sliding bearings or hydrodynamic bearings. However, these simple closed pad hydrostatic bearings only provide the function of some load relief and friction reduction. They themselves generally do not provide precision movement or very significant load carrying. Nor can they adjust pressure in response to varying loading conditions actively.

SUMMARY

According to one aspect of the present disclosure, a hydraulic bearing system is provided. The hydraulic bearing system is capable of variable load carrying capability and precision motion on a guideway. The hydraulic bearing system includes a bearing body, a fluid medium, a sealing bearing member and a pressurizing actuation means that can apply a force to pressurize the fluid medium. The bearing body includes an internal pocket with an open side facing a surface of said guideway. The fluid medium is contained inside said internal pocket and is in contact with said surface of said guideway on said open side. The sealing bearing member is in contact with said surface of said guideway and seals clearance between said bearing body and said surface of said guideway to confine said fluid medium and limit leakage out of said internal pocket at a predetermined minimal level. Therefore the pocket becomes a sealed pocket and the bearing becomes a sealed pad bearing, as opposed to traditional hydrostatic bearing pads having a gap with fluid passing constantly. The pressurizing actuation means pressurizes the confined fluid medium through a small passage and generate a large force against the surface of said guideway by applying the principle of connected vessels, so that the pressurized fluid medium carries a main portion of a load carried by the hydraulic bearing system. Because the pressurizing actuation means only needs to apply a small force, it can be comparatively smaller than the bearing body and therefore can be installed or made as an integral part of the bearing body, making the bearing system compact.

According to another aspect of the present disclosure, a machine stage system is provided. The machine stage system is capable of variable load carrying capability and precision motion and includes a guideway and a carriage having a set of hydraulic bearing systems riding on said guideway. Each of the hydraulic bearing systems includes a bearing body, a fluid medium, a sealing bearing member and a pressurizing actuation means. The bearing body includes an internal pocket with an open side facing a surface of said guideway. The fluid medium is contained inside said internal pocket and is in contact with said surface of said guideway on said open side. The sealing bearing member is in contact with said surface of said guideway and seals clearance between said bearing body and said surface of said guideway to confine said fluid medium and limit leakage out of said pocket at a predetermined minimal level. Therefore the pocket becomes a sealed pocket and the bearing becomes a sealed pad bearing. The sealing bearing member includes a coupling means that allows relative displacement with respect to said bearing body. The pressurizing actuation means pressurizes the confined fluid medium through a small passage by applying the principle of connected vessels, the pressurized fluid medium carrying a main portion of a load carried on each of said-hydraulic bearing systems.

BRIEF DESCRIPTION OF THE DRAWINGS

The present disclosure can be more fully understood by reading the following detailed description of the embodiment, with reference made to the accompanying drawings as follows.

DETAILED DESCRIPTION

It is therefore the purpose of the present disclosure to provide a new hydraulic bearing system featuring a new "sealed pad hydrostatic bearing" with a simple, compact and low cost design in order to reduce or eliminate the disadvantage of requiring complex oil supply and handling system on existing hydrostatic bearing systems.

It is also the purpose of the present disclosure to provide a new bearing system with a simple and compact design that allows active adjustment of bearing pressure and load carrying capacity and at the same time also allows for precision movement.

Furthermore, it is the purpose of the present disclosure to provide a machine stage system that uses the new bearings system together an active bearing pressure adjustment system that enables precise, micro-scale adjustments of the displacement or the orientation of a machine carriage on a linear or rotary guideway in order for compensating loading variations and maintaining positioning precision.

Figure 1:
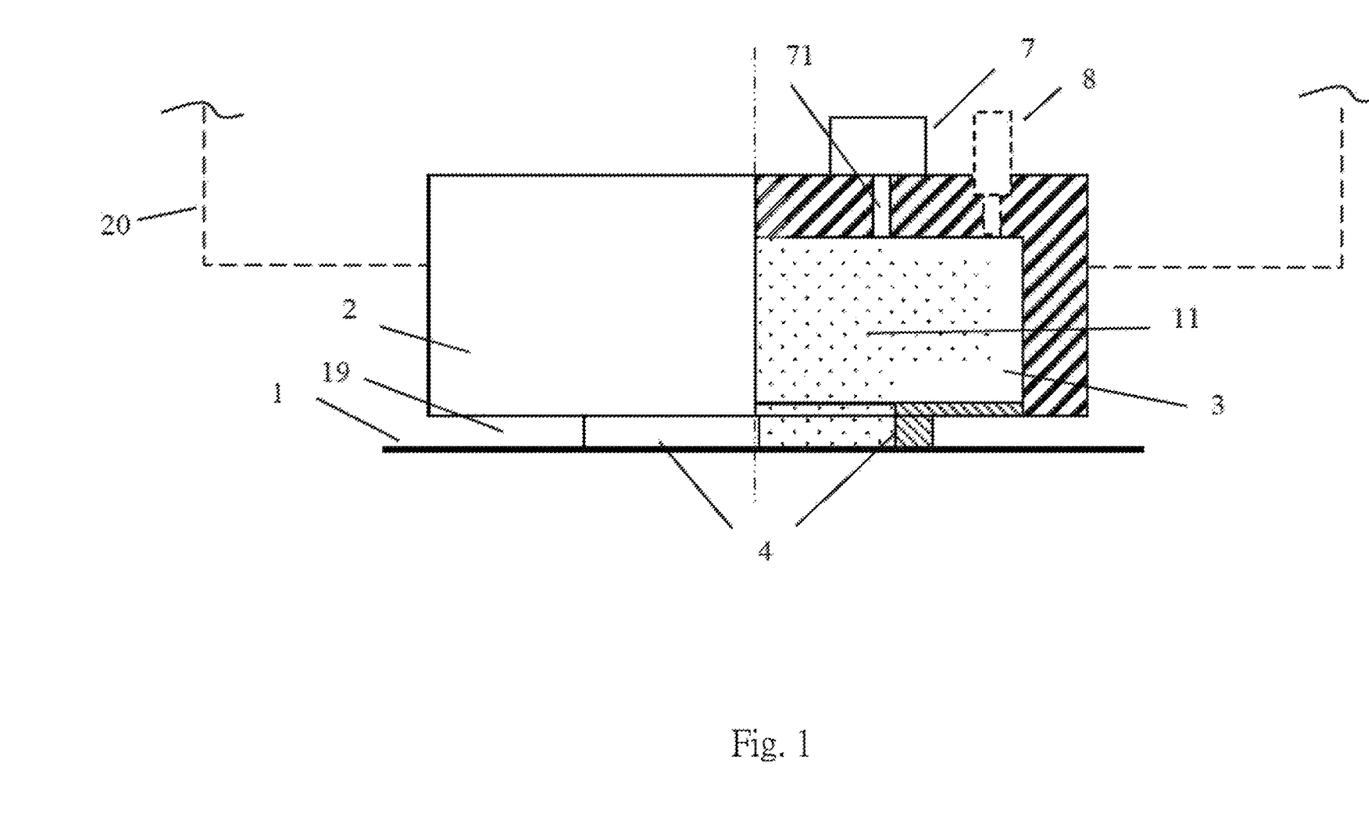
FIG. 1 illustrates a basic concept of a compact bearing system of the present disclosure.

The basic concept of the Sealed Pad Hydrostatic Bearing (SPHB), as depicted in FIG. 1 in half-cross-sectional view, uses a pressurized fluid medium 11 confined in a fluid pocket 3 between a bearing body 2 and a guideway 1 to carry load, as in the case of a conventional hydrostatic bearing, but it closes the gap (clearance) 19 between the hydrostatic bearing block and the guideway (i.e. the land) with a sealing bearing member 4 and pressurizes the enclosed fluid by a small pressurizing actuation means 7 through a small diameter duct 71 to generate required loading capacity. Therefore the pocket becomes a sealed pocket and the bearing becomes a sealed pad bearing. By applying the principle of connected vessels (or called communicating vessels, or Pascal's law), a small force from the small pressurizing actuation means 7 pressurizing oil through the small diameter duct 71 can generate a large pressure that can results in a large force in the pocket 3 with a large load carrying area. The contact between the sealing bearing member 4 and the guideway 1 is a solid to solid contact similar to the case of a sliding contact bearing. However, the difference is that the pressurized oil inside the pocket 3 takes up most of the load, with the sealing bearing member 4 under only a fraction of the total load, which can be much lower than those in cases of stages using only general sliding contact bearings. The pressure between the sealing bearing member 4 and the guideway 1 only needs to be large enough to seal the pressurized fluid and can be much lower than the pressure inside the pocket 3. As a result, the friction of the contact is also much lower than those in cases of stages using only general sliding contact bearings. Thus, the effect of the SPHB is similar to the combination of a conventional hydrostatic bearing with a lightly-loaded sliding contact bearing, but without the complex fluid circulation system. Compared to a conventional hydrostatic bearing, despite of including the sliding contact sealing bearing member 4, the SPHB can still have high precision. For example, in modern arts of bearing technologies, lightly preloaded sliding contact bearings can still reach sub-micrometer precision and are applied in wafer steppers and instruments (Ref. Slocum, A. H., Precision Machine Design, Prentice Hall, New Jersey, 1992, Chapter 8, which is incorporated herein by reference).

In addition, a pressure regulation means 8 capable of exerting a force to the fluid medium can be used to maintain pressure of the confined fluid medium 11 within a predetermined range, thereby maintaining load carrying range during system operation.

Figure 2:
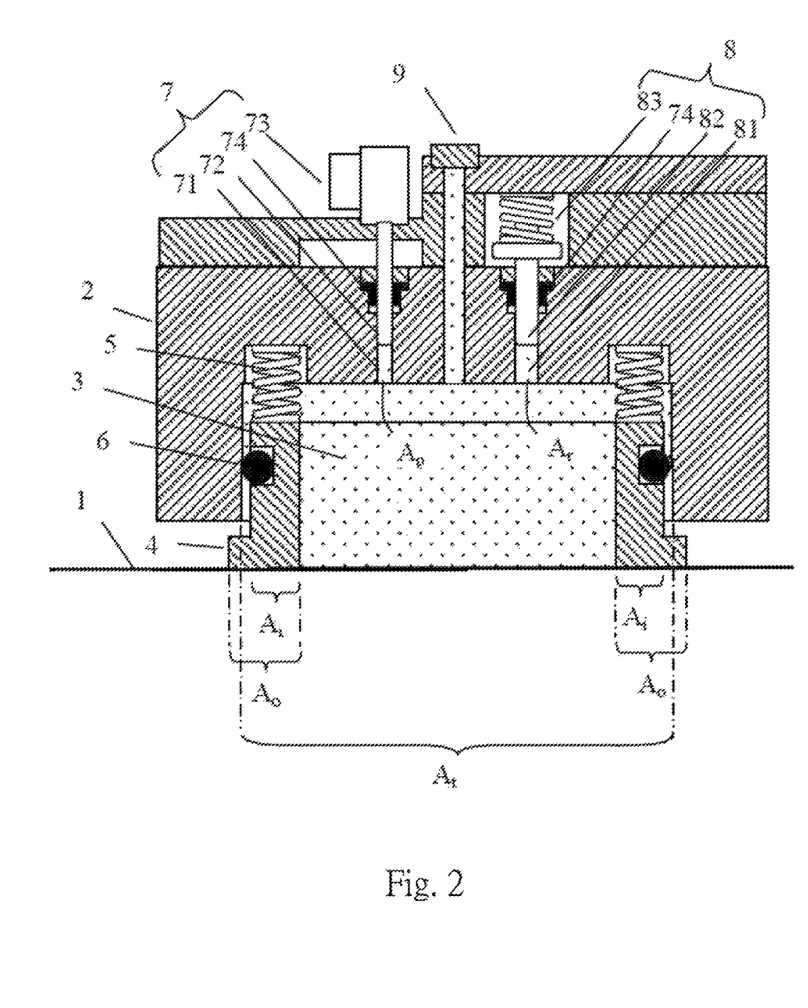
FIG. 2 illustrates a first preferred embodiment of the compact bearing system according to the present disclosure.

FIG. 2 illustrates a first preferred implementation of the SPHB concept in cross-sectional view. The bearing body 2 includes a pocket 3 filled with oil (or any suitable hydraulic fluid). The pocket 3 has one side open toward the guideway 1. A sealing bearing member 4 is assembled to the bearing body 2 from the open side. A seal, such as an O-ring 6 seals the clearance 19 between the external side surface of the sealing bearing member 4 and the internal wall of the pocket 3. The lower rim of the sealing bearing member 4 is in contact with the guideway 1, forming a seal, which is also a contact sliding bearing. The small pressurizing actuation means 7 includes an actuator 73 pushes a piston 72. To pressurize the oil, the actuator 73 pushes the piston 72 in the duct 71. By the principle of connected vessels, the load carrying capacity FL of the SPHB and the force Fp required to push the piston 72 are as follows respectively, FL=P At; and Fp=P Ap, wherein P is the pressure in the pocket 3 and the duct 71, At is the total acting area of hydraulic pressure that can generate upward load carrying force, and Ap the cross sectional area of the pressurizing duct 71. For example, assuming Ap=1 mm$^2$, the actuator 73 needs only to exert a force of 0.31 kgw (3N), a bearing pocket pressure of 30 bar can be generated, which is equivalent to bearing hydraulic pressure on conventional hydrostatic bearings. Under this pocket pressure, a bearing pad area of 10 mm×10 mm can carry 32 kgw (313 N). Because the pressurizing actuation means 7 only needs to apply a small force, it can be comparatively smaller than the bearing body and therefore can be installed on the bearing body as an integral part of the bearing body, as depicted in the drawing, making the bearing system compact. And the actuator 73 can be actuated by electricity, eliminating the need of external bulky pressurizing system away from the bearing. Further, since the oil is confined and the pocket is sealed, there is no need of external oil supply and circulation system away from the bearing or the machine stage either.

Regarding the sealing bearing member 4, the force pushing it toward the guideway 1 must be larger than the force pushing it away from the guideway 1 in order for it to seal the contact surface and prevent leakage of the pressurized oil in the pocket. That is, Fs+PAi≥0.5 PAo.

Wherein Fs is the force of the preloading spring 5; Ai is the acting area of hydraulic pressure pushing the sealing bearing member 4 toward the guideway 1; Ao is the acting area of hydraulic pressure pushing the sealing bearing member 4 away from the guideway 1; and 0.5 P is averaged oil pressure in the contact area assuming a linearly decreasing pressure profile from P. From the above relation, we see that when Ai=0.5 Ao, the system is theoretically self-sealing; with the preloading spring 5 providing extra sealing force Fs. When Ai>0.5 Ao the system will have "over balanced" sealing force. This principle of "seal hydraulic balance" is basically the same principle applied in the art of mechanical seal (or mechanical face seal), which is widely used on rotating shafts in high pressure liquid pumps (Ref. Handbook of Fluid Sealing, ed. by Brink, R. V., McGraw Hill, New York, 1993, Chapter 8, which is incorporated herein by reference). If the hydrostatic load carrying force FL takes all the load from a machine (or a stage carriage 20), then the force exerted by the sealing bearing member 4 on the guideway 1 surface, i.e. solid to solid contacting force, only comes from the the spring force Fs of the preload spring 5 and the hydraulic force due to area difference (Ai−0.5 Ao). Under the condition of keeping the oil sealed, adjusting the spring force Fs and the area difference (Ai−0.5 Ao) can adjust the solid to solid contacting force so that the difference between the static friction and the dynamic friction can be minimized, thereby minimizing the stick-slip phenomenon.

The sealing bearing member 4 can be the type similar to a mechanical face seal or can be the type of molder packing. Mechanical face seal materials include carbon, graphite or resin or metal matrix composites. Molded packing type of seal materials include leather, rubber, fiber reinforced rubber, or polymer materials such as NBR or PTFE. These are some common materials used in the art of fluid sealing. On the other hand, materials commonly used for sliding contact bearings on machine tools include PTFE film (such as Turcite and Glacier DU) and metal pairs (such as brass to steel). Other engineering materials such as Acetron and Derlin can also be used.

The actuator 73 can apply stacked piezoelectric actuators or a servo motor with force amplification mechanism such as worm gears, in order to generate required force. Pressurization can even be done manually.

The pressure regulation means 8 can be used to adjust the stiffness and damping characteristics of the system. Its construction is similar to the pressure actuation means 7, except that a spring 83 and a displacement clearance adjusting mechanism replace the actuator to adjust and set the reaction force and the allowed displacement of the piston 82. Item 81 is a small fluid passage corresponding to the pressure regulation means. The pressure regulation means 8 can be a passive unit or can be an active unit applying a powered actuator to enhance its capability. A passive air-chamber type pressure compensator commonly used for stabilizing flow pressure can also be used. In addition, item 9 in FIG. 1 represents a cover plugging an inlet for replenishing fluid for maintenance need.

The preloading spring 5 is preferred for handling operational variations but is not necessary. If the load is large and stable, the bearing body 2 and the sealing bearing member 4 can be an integral part and the pressure regulator 8 can handle operational variations.

Figure 3:
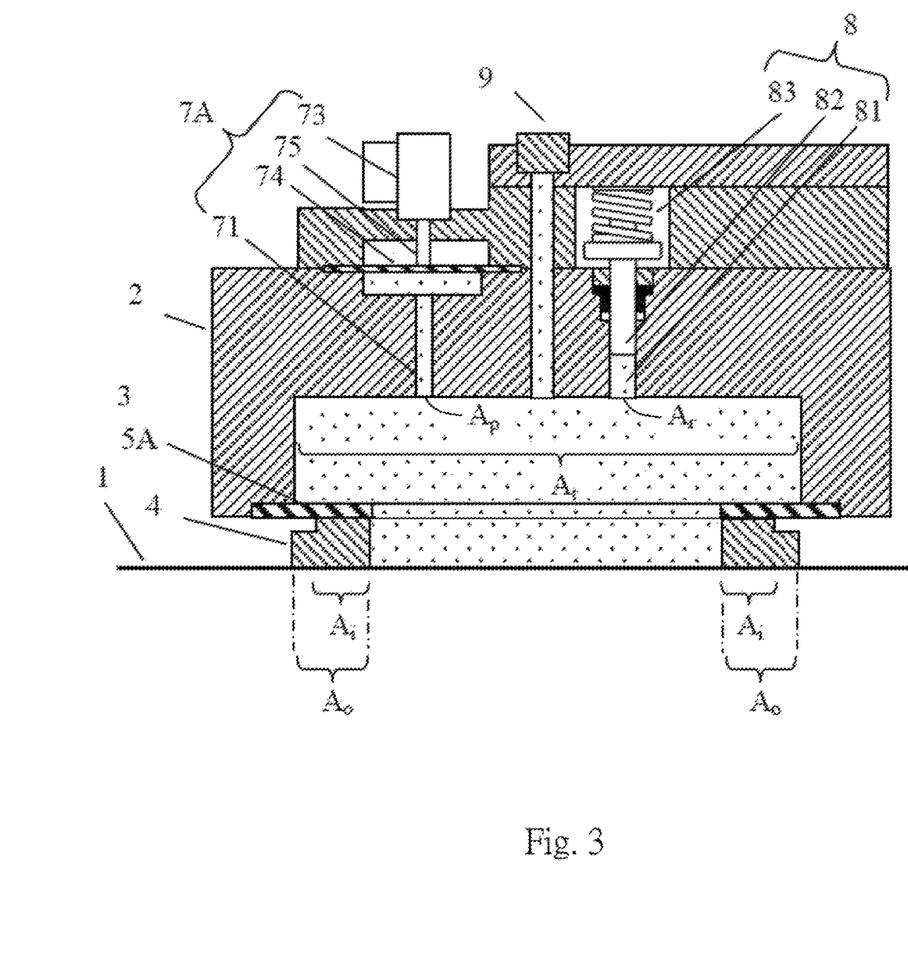
FIG. 3 illustrates a second preferred embodiment of the compact bearing system according to the present disclosure.

There can be other constructions of the SPHB based on the same principle described above. For example, FIG. 3 illustrates a second preferred example embodiment. A membrane spring (diaphragm) 5A replaces the spring 5 in FIG. 1. It also has the function of sealing, replacing O-ring 6. In addition, in the pressurizing system 7A, a membrane spring 5A also replaces a molded packing seal 74. A pushing pin 75 now pushes on the membrane to cause pressurization.

Figure 4:
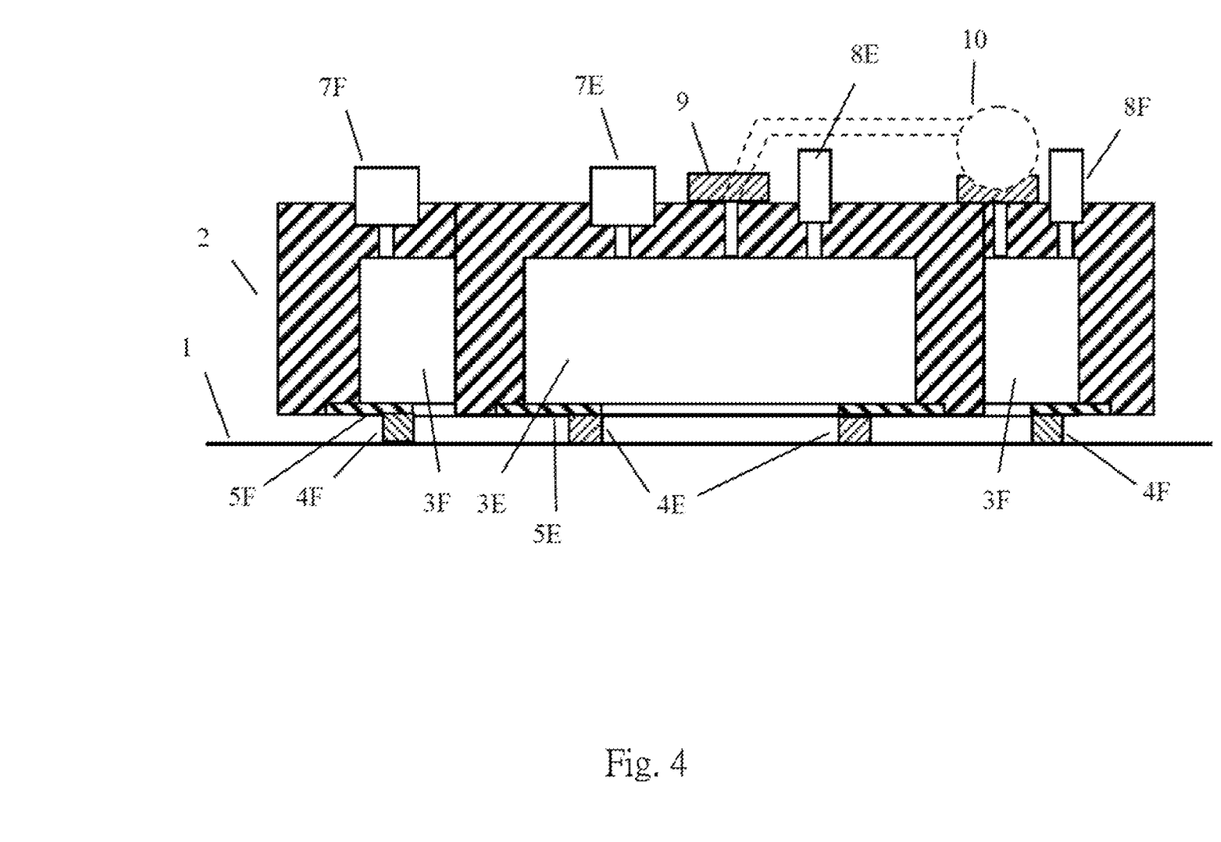
FIG. 4 illustrates a third preferred embodiment of the compact bearing system according to the present disclosure, featuring multiple layers of fluid pockets.

Still another variation of the SPHB concept is to use multi-layered oil pockets 3E, 3F, as shown in FIG. 4. That is, the fluid pocket in the bearing body 2 can have a structure with concentric walls separating the pocket into concentric regions, with each region using a separate sealing bearing member 4E, 4F (on membrane springs 5E, 5F). In other words, or another way to look at this configuration, the multiple concentric structures of ring shaped pockets 3E, 3F and sealing bearing members 4E, 4F form separate but cascaded oil pockets 3E, 3F. The pressures in the cascaded pockets 3E and 3F can also be made cascaded by applying separate pressurizing actuation means 7E and 7F respectively. Similarly, separate pressure regulation means 8E, 8F can be used in separate pockets respectively. For example, in the center oil pocket 3E the pressure is P. In the ring oil pockets 3F next to the center one the pressure is P1, slightly lower than P. In this way, pressure difference between adjacent oil pockets 3E and 3F and between the ring oil pocket 3F and the outside atmosphere can be smaller than in the case of using a single pocket. This allows the sealing bearing member 4E, 4F to have better sealing ability. This is illustrated in FIG. 4.

In case of fluid leakage, as this may be inevitable in some types of mechanical seals, the leakage rate is usually several orders of magnitude smaller than the fluid circulation rate of conventional hydrostatic bearing. This is because the effective bearing gap is now very small, leading to very small flow rate. In this case, a small pump can be applied to pressurize as well as to replenish the oil. Because the flow rate is so low, the pump can be small enough to be placed on the stage and its effect on the machine precision can also be minimized even if it sits on the stage. Further, because the bearing still has a solid to solid contact, flow resistance is of less concern here. The slow rate oil replenishing and circulating system can be much simpler than conventional hydrostatic bearings. Such a fluid recycling pumping system is illustrated in FIG. 4; a small circulating pump system 10 is used.

When the sealing bearing member 4 includes a coupling means to the bearing body, such as the springs 5, 5A and O-ring 6 mechanism in FIGS. 2 and 3, it can have a small relative displacement with respect to said bearing body mainly in the direction perpendicular to the guideway 1 surface. If incompressible fluid, such as oil or water, is used, because the fluid confined inside the pocket 3 is of a fixed volume, a change of position of the piston 72 or the pushing pin 75 will cause expansion or contraction of the fluid volume. This allows minute adjustment of the clearance 19 between the bearing body 2 and the guideway 1 surface, that is, the vertical position of a carriage 20 on the guideway 1.

In order to apply the SPHB to a linear stage or a rotary table, a bearing system of multiple pads with opposed pads arranged in proper directions at selected locations can be used, similar to the cases of using conventional hydrostatic bearing. The multiple pads can be inter-connected or can be independent. In the case of independent pads, the pressure in each pad can be independently controlled. By using piezo or small servo motors as actuators on each pad, the pressure in each pad can be actively and independently controlled. This allows minute adjustment, as allowed by the coupling mechanism between the bearing body 2 and the sealing bearing member 4, of both the displacement and the orientation of a machine carriage 20 on a linear or rotary guideway, which can be very useful for compensating loading variations and maintaining positioning precision. And all these controls can be done by "wire", that is, by electrical signals.

Figure 5:
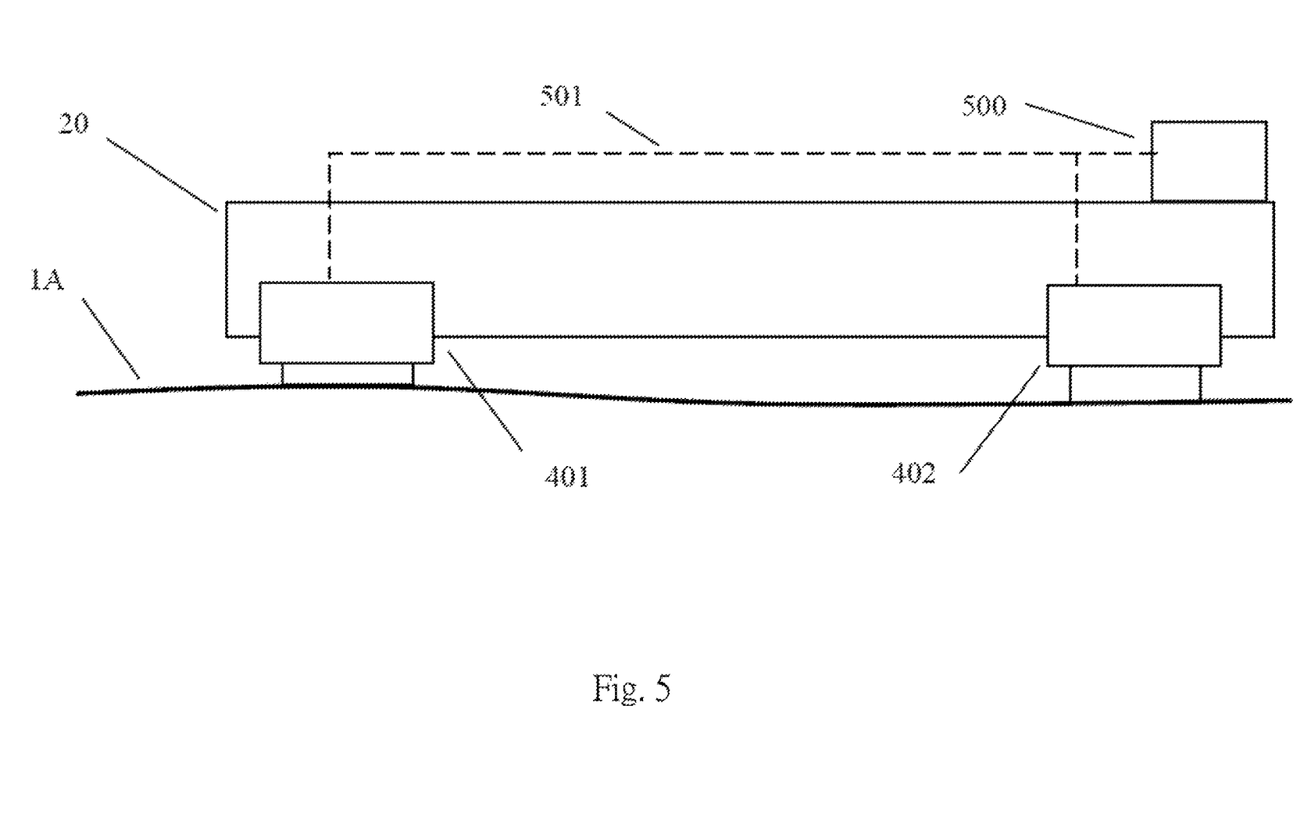
FIG. 5 illustrates a simplified view of a machine stage system with multiple compact bearing systems of the present disclosure.

FIG. 5 illustrates a simplified view of a machine stage with multiple bearings of the present disclosure. With independently adjusted bearing, even if the guideway surface 1A is not completely flat, a control system 500 is able to "pose" the carriage 20 to maintain desired orientation and elevation by driving the SPHB sealing bearing members 401, 402 via electric signal on wires 501 to push the sealing bearing members 401, 402 to different heights.

Figure 6:
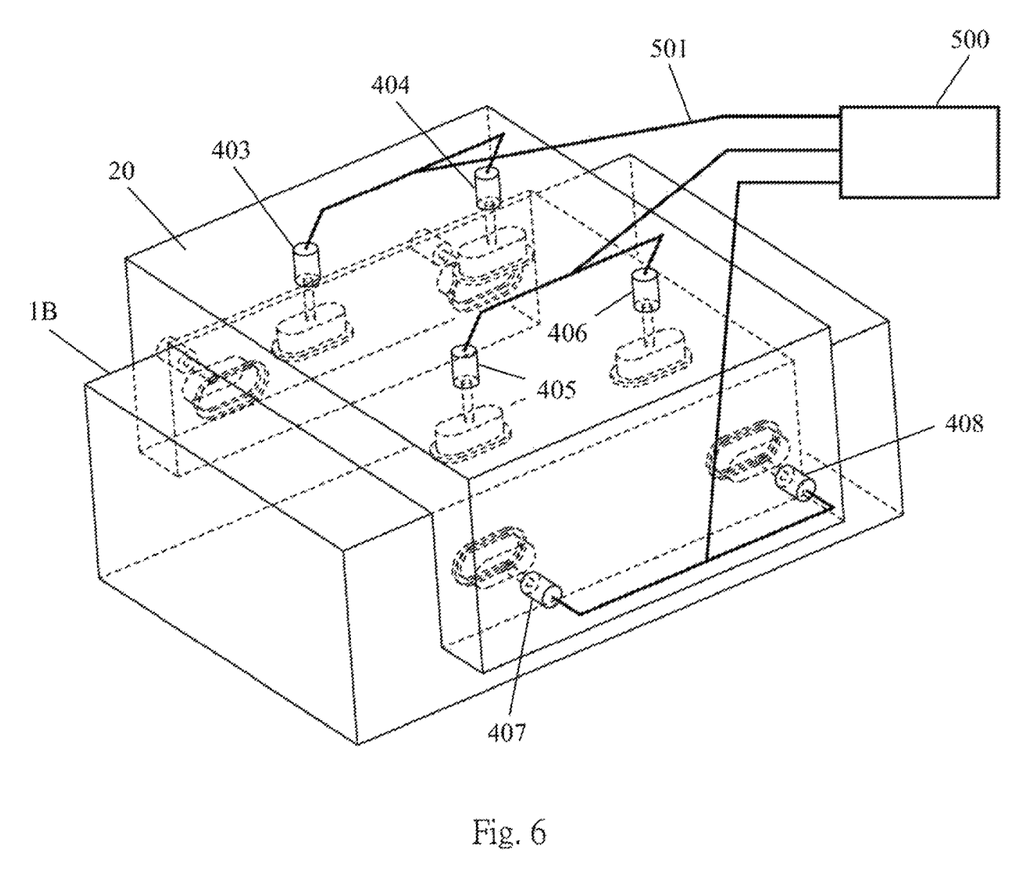
FIG. 6 illustrates a perspective view of a machine stage system with multiple compact bearing systems of the present disclosure.

FIG. 6 illustrates a perspective view of a machine stage with multiple bearing systems of the present disclosure. For example, in FIG. 6, 403-408 six independently controlled SPHB bearing systems 403-408 are used. The orientation of the carriage 20 on the guideway 1B can be adjusted in microscale.

To ensure good sealing, the flatness and the surface finish of the contacting surfaces on both the guideway 1B and the sealing bearing member 4 need to be high. Polishing a long guideway 1B to high flatness can involve very high cost. A solution to the issue to use polished or glazed porcelain tiles as guideway surface 1A. These tiles are usually used for construction or interior decoration purposes. We have discovered that they provide acceptable surface finish and local flatness for the purpose of the present disclosure.

The fluid medium 11 described in the present disclosure should be understood as any suitable medium that can change shape and can take pressure, including oil, water air and other suitable fluids and fluids with any additives and multi-phase members.

In sum, the present disclosure provides a new bearing system with a simple, compact and low cost design in order to reduce or eliminate the disadvantage of requiring complex oil supply and handling system on existing hydrostatic bearing systems. Moreover, the compact design of the new bearing system allows active adjustment of bearing pressure and load carrying capacity and at the same time also allows for precision movement.

Furthermore, the present disclosure also provides a machine stage system that uses the new bearings system together an active bearing pressure adjustment system that enables precise, micro-scale adjustments of the displacement or the orientation of a machine carriage on a linear or rotary guideway in order for compensating loading variations and maintaining positioning precision.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hydraulic bearing system capable of variable load carrying capability and precision motion on a guideway and requiring no external fluid circulation or external pressurizing mechanism, the hydraulic bearing system comprising:
   a bearing body comprising a central internal pocket with an open side facing a surface of said guideway;
   a fluid medium contained inside said central internal pocket and being in contact with said surface of said guideway on said open side;
   a central sealing bearing member being in contact with said surface of said guideway and sealing clearance between said bearing body and said surface of said guideway to confine said fluid medium and limit leakage out of said internal pocket at a predetermined minimal level, thereby making said central internal pocket a sealed pocket; and
   a pressurizing actuation means capable of exerting an actuation force to pressurize said fluid medium in said central internal pocket, said pressurizing actuation means being installed as an integral part of said bearing body and pressurizing the confined fluid medium through a passage to generate a load-carrying force against the surface of said guideway, wherein said passage has a cross-sectional area smaller than a contact area between said fluid medium and said guideway such that said load-carrying force is larger than said actuation force based on the principle of connected vessels, and the pressurized fluid medium carrying a main portion of a load carried on said hydraulic bearing system.

2. The hydraulic bearing system of claim 1, further comprising a pressure regulation means capable of exerting a regulating force to pressurize said fluid medium in said central internal pocket, said pressure regulation means being installed on said bearing body and maintaining pressure of said confined fluid medium within a predetermined range thereby maintaining the range of a load carrying force during operation.

3. The hydraulic bearing system of claim 2, said pressure regulation means comprising a spring loaded piston to apply said regulating force to said fluid medium through a passage leading to said internal pocket, said passage having a cross-sectional area smaller than the contact area between said fluid medium and said guideway such that said regulating force can be reduced by applying the principle of connected vessels.

4. The hydraulic bearing system of claim 1, wherein said pressurizing actuation means comprises a mechanism of a piston in said passage, said piston being actuated by an electric actuator installed on said bearing body.

5. The hydraulic bearing system of claim 1, wherein said pressurizing actuation means comprises a membrane spring and a pushing pin mechanism actuated by an electric actuator installed on said bearing body.

6. The hydraulic bearing system of claim 1, wherein said central sealing bearing member comprises a coupling means that allows relative displacement with respect to said bearing body.

7. The hydraulic bearing system of claim 6, further comprising:
   at least one additional pocket in said bearing body with an open side facing said surface of said guideway, said additional pocket surrounding said central internal pocket and forming a separate pocket;
   additional fluid medium contained inside said additional pocket and being in contact with said surface of said guideway;
   at least one additional sealing bearing member corresponding to said additional pocket, said additional sealing bearing member being in contact with said surface of said guideway and sealing clearance between said bearing body and said surface of said guideway to confine said additional fluid medium inside said additional pocket and limit fluid medium leakage rate; and at least one additional pressurizing actuation means pressurizing the confined fluid medium inside said additional pocket through an additional passage by applying the principle of connected vessels;

thereby said additional pocket with the corresponding additional sealing bearing member and said central internal pocket with said central sealing bearing member forming a multi-layer structure of cascaded pockets.

8. The hydraulic bearing system of claim 7, wherein:

said pressurizing actuation means and said additional pressurizing actuation means setting said fluid medium in said cascaded pockets at different pressures with the highest pressure in the central internal pocket;

said system further comprising a pumping system for recycling said fluid medium from pockets of lower pressure back to said central internal pocket.

9. A machine stage system capable of variable load carrying capability and precision motion and requiring no external fluid circulation or external pressurizing mechanism, said system comprising a guideway and a carriage having a set of hydraulic bearing systems riding on said guideway, each of the hydraulic bearing systems comprising:

a bearing body comprising an internal pocket with an open side facing a surface of said guideway;

a fluid medium contained inside said internal pocket and being in contact with said surface of said guideway on said open side;

a sealing bearing member being in contact with said surface of said guideway and sealing clearance between said bearing body and said surface of said guideway to confine said fluid medium and limit leakage out of said pocket at a predetermined minimal level, said sealing bearing member comprising a coupling means that allows relative displacement with respect to said bearing body, thereby making said internal pocket a sealed pocket; and a pressurizing actuation means capable of exerting an actuation force to pressurize said fluid medium in said internal pocket, said pressurizing actuation means being installed as an integral part of said bearing body and pressurizing the confined fluid medium through a passage to generate a load-carrying force against the surface of said guideway, said passage having a cross-sectional area smaller than a contact area between said fluid medium and said guideway such that said load-carrying force is larger than said actuation force based on the principle of connected vessels, the pressurized fluid medium carrying a main portion of a load carried on each of said hydraulic bearing systems.

10. The machine stage system of claim 9, wherein said surface of said guideway comprises at least one porcelain tile, wherein said porcelain tile is a polished tile or a glazed tile.

11. The machine stage system of claim 9, further comprising a bearing actuation control system for individually controlling said pressurizing actuation means of each of said hydraulic bearing systems in order to adjust displacements and orientations of said carriage in microscale in multiple degrees of freedom.

* * * * *